United States Patent [19]
Martin

[11] 3,812,315
[45] May 21, 1974

[54] MICRO-WAVE HEATER

[76] Inventor: Norman Eugene Martin, 3529 Van Buren, ElPaso, Tex. 79930

[22] Filed: Feb. 27, 1973

[21] Appl. No.: 336,220

[52] U.S. Cl. ......... 219/10.55, 219/10.51, 219/10.65, 219/10.81
[51] Int. Cl. ....... H05b 9/06, H05b 9/04, H05b 5/00
[58] Field of Search ........... 219/10.51, 10.55, 10.65, 219/10.81

[56] References Cited
UNITED STATES PATENTS
| | | | |
|---|---|---|---|
| 2,508,365 | 5/1950 | Bierwirth | 219/10.81 X |
| 3,517,151 | 6/1970 | Mekjean | 219/10.51 X |

*Primary Examiner*—J. V. Truhe
*Assistant Examiner*—Hugh D. Jaeger
*Attorney, Agent, or Firm*—James J. Brown

[57] ABSTRACT

A fluid, such as water, is heated on demand and supplied either hot or boiling by the device of the present invention which comprises, generally, a coiled tubular reservoir which is heated in different areas by a plurality of sequentially arranged pairs of dielectric plates. Micro-wave energy is supplied to the respective pairs of dielectric plates selectively by means of electrical switching mechanisms and thermostatic controls so that either hot or boiling water is quickly available and a continuous flow is maintained as required.

6 Claims, 2 Drawing Figures

3,812,315

3,812,315

MICRO-WAVE HEATER

BACKGROUND OF THE INVENTION

Substantially all water heating installations currently in use require separate hot and cold plumbing. The hot water is normally supplied from a centrally located heating reservoir through separate hot water plumbing. The present invention heats water at the actual dispensing point thus negating the requirements for separate systems of hot and cold plumbing. This device is suitable for installation in bathrooms, utility rooms, kitchens, washrooms and all locations where hot water is either desired or required and wherein there are available sources of electricity and water.

It is a principal object of this invention to provide a device for heating water rapidly, utilizing micro-wave radiation at the point of use.

Another object of this invention is to provide a device of the described characteristics with a simplified structure that is relatively inexpensive to manufacture, to install and to remove and which will reduce the requirements of and expense for separate hot and cold plumbing as well as to provide significant economy in water heating operations. It is a further object of this invention to provide a capability for supplying hot water up to boiling temperatures directly from a dispensing device such as a standard water faucet.

Other objects and advantages of this invention will be apparent during the course of the following detailed description of the invention, taken in connection with the accompanying drawings forming a part of this disclosure.

BRIEF DESCRIPTION OF THE INVENTION

According to the present invention, a device is provided whereby water is heated substantially on demand and is supplied either hot or boiling, as required. Briefly, a coiled, tubular water reservoir is heated in respective areas by a series of individually, thermostatically controlled, dielectric plates. Water-flow control thermostats located at the terminus of the water reservoir prevent the flow of water until it is heated to the proper temperature. By means of electrical switching mechanisms and thermostatic controls, power is selectively and automatically directed to the respective dielectric plates in such a way that either hot or boiling water is quickly available and a continuous flow thereof at the proper temperature is maintained. In yet a further feature of the invention, a stream of unheated water is diverted to a third tap prior to entering the water reservoir.

SUMMARY OF THE INVENTION

Figure 1:
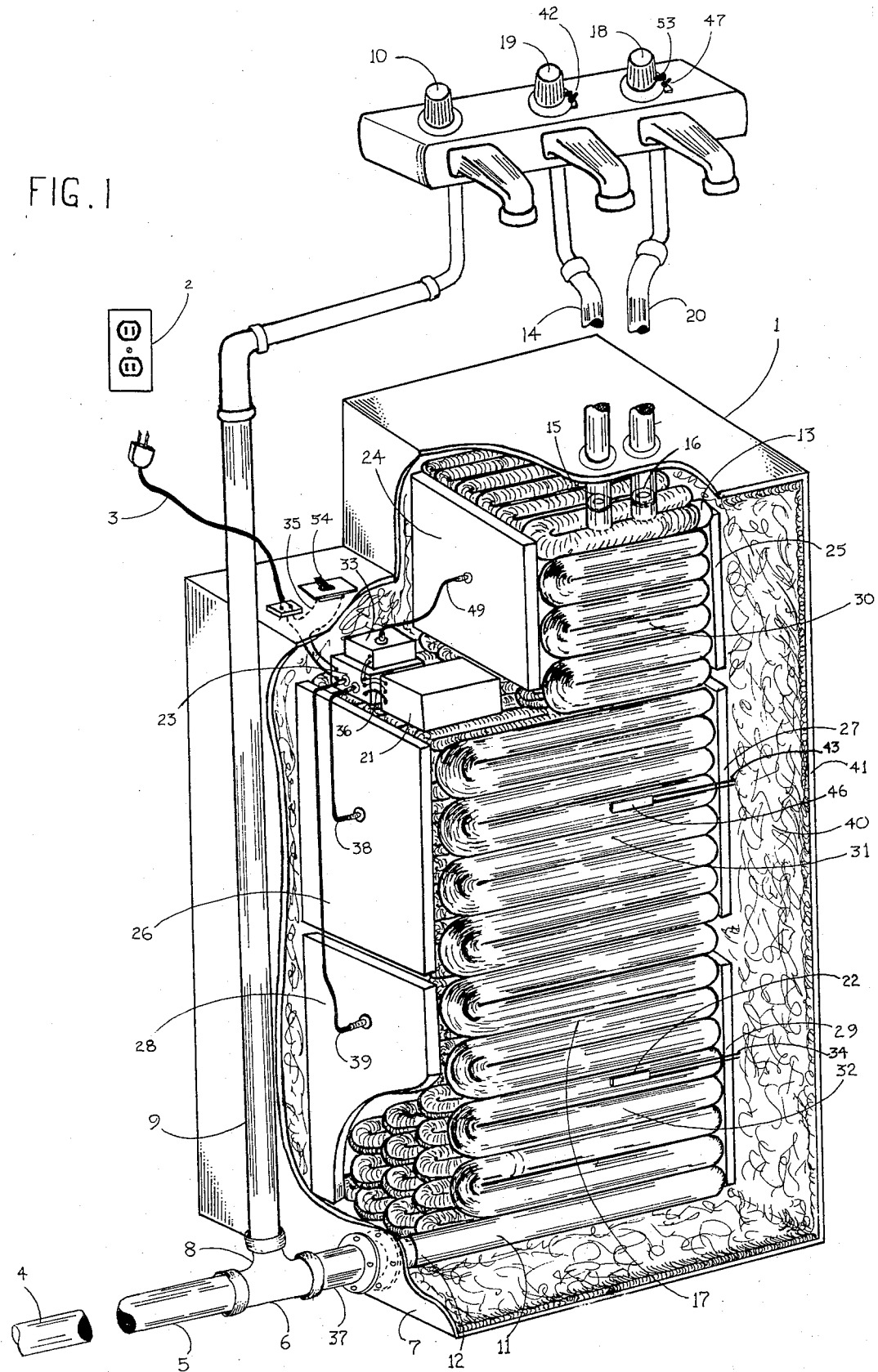
FIG. 1 is a perspective view of the present invention.

In the drawings wherein for the purpose of illustration there is shown a preferred embodiment of the invention and wherein similar reference characters designate corresponding parts throughout the several views, the complete device is designated by the numeral 1. It is to be understood that many of the individual components of the present invention are in themselves well known in the prior art. No attempt is made, therefore, to describe with particularity these components other than as they function in relation to the present invention.

It will be seen by reference to FIG. 1 that the present invention is contained within a metal case 41 with an internal insulating blanket 40. The metal case 41 acts as a shield against the dissemination of micro-wave radiation beyond the enclosed system, as a mounting platform for switching units, electronic configurations, and plumbing attachments. The insulating blanket 40 retards heat loss from the fluids contained within the internal reservoir system 17.

Said system is connected to a commercial electrical source 2 through standard electric wiring 3 and to a commercial source of pressurized non-heated water 4 by conventional plumbing means 5. The pressurized water flows from its source through standard plumbing to a "T"-fitting 6 located exterior to the body of the heating chamber 7.

The flow path of the pressurized water upon reaching the "T"-fitting 6 is split by the "T"-fitting 6 into two flow paths. One flow path is directed out of the top 8 of the "T"-fitting 6 through standard plumbing 9 to a standard manually operated water tap 10 which may be opened and closed in a normal fashion to permit the withdrawal of non-heated tap water when desired by the user of the present invention. In the second flow path the pressurized water flows straight through the "T"-fitting into a standard plumbing pipe 37 which connects directly to a continuous coil of nylon reinforced teflon tubing 11 which comprises a tubular water reservoir that extends from a beginning lower end 12 to a terminal point 13 located slightly beyond its junction with the boiling water delivery pipe 20. Two conventional bimetallic water flow control thermostats, a hot water thermostat 15 and a boiling water thermostat 16, prevent the further flow of water through the tubular reservoir system 17 until they are heated by the water within said reservoir to such a degree that they open and thus permit further water flow. The hot water thermostat 15 is most normally configurated to open at a water temperature of 90° F.; however, it may be configurated to open at any desired temperature. The boiling water thermostat 16 is most normally configurated to open at 212° F.; however, it may be configurated to open at any desired temperature.

Opening of the hot water thermostat 15 permits the flow of water through the tubular water reservoir 17 past the hot water thermostat 15 and through the hot water delivery pipe 14 to a standard manually operated hot water delivery tap 19 which may be opened and closed in normal fashion to permit the withdrawal of heated water when desired by the user. The hot water delivery tap 19 must be left in the closed position to permit the water contained within the reservoir to heat to such a temperature that the boiling water thermostat 16 opens thermostatically to permit the flow of water past the boiling water thermostat 16 and through the boiling water delivery pipe 20 to a standard manually operated water tap 18 that may be opened and closed in normal fashion to permit withdrawal of boiling water when desired by the user of the present invention.

Thus it is obvious that water or, for that matter, any fluid under pressure directed into the above described system will flow through the reservoir to the contained thermostats and, upon the opening of said thermostats through suitable plumbing, to standard manually operated delivery taps that when opened will permit the withdrawal of the water or other fluid in the system.

Referring to FIG. 1, heating of the water within the reservoir system 17 is accomplished by the selective distribution of micro-wave energy produced by a micro-wave generating unit 21 of standard design and well known in prior art. In the embodiment shown of the present invention the selective distribution of micro-wave radiation is accomplished by two wave guide switching units, a primary wave guide switching unit 23 and a boiling water wave guide switching unit 33 through three separate sets of capacitive plates each insulated from the other and positioned laterally against the sides of the teflon tube fluid reservoir 11. An on-off master switch 54 activates or deactivates the unit.

The three sets of capacitive plates are designated: boiling water transmitting plate 24, boiling water receiving plate 25, initial reservoir transmitting plate 26, initial reservoir receiving plate 27, secondary reservoir transmitting plate 28 and secondary reservoir receiving plate 29. The positioning of the separate sets of capacitive plates 24, 25, 26, 27, 28 and 29, respectively, has the effect of structuring three separate water heating chambers within the continuous teflon tubing reservoir 17: a boiling water chamber 30, an initial hot water heating chamber 31, and a secondary hot water heating chamber 32.

Figure 2:
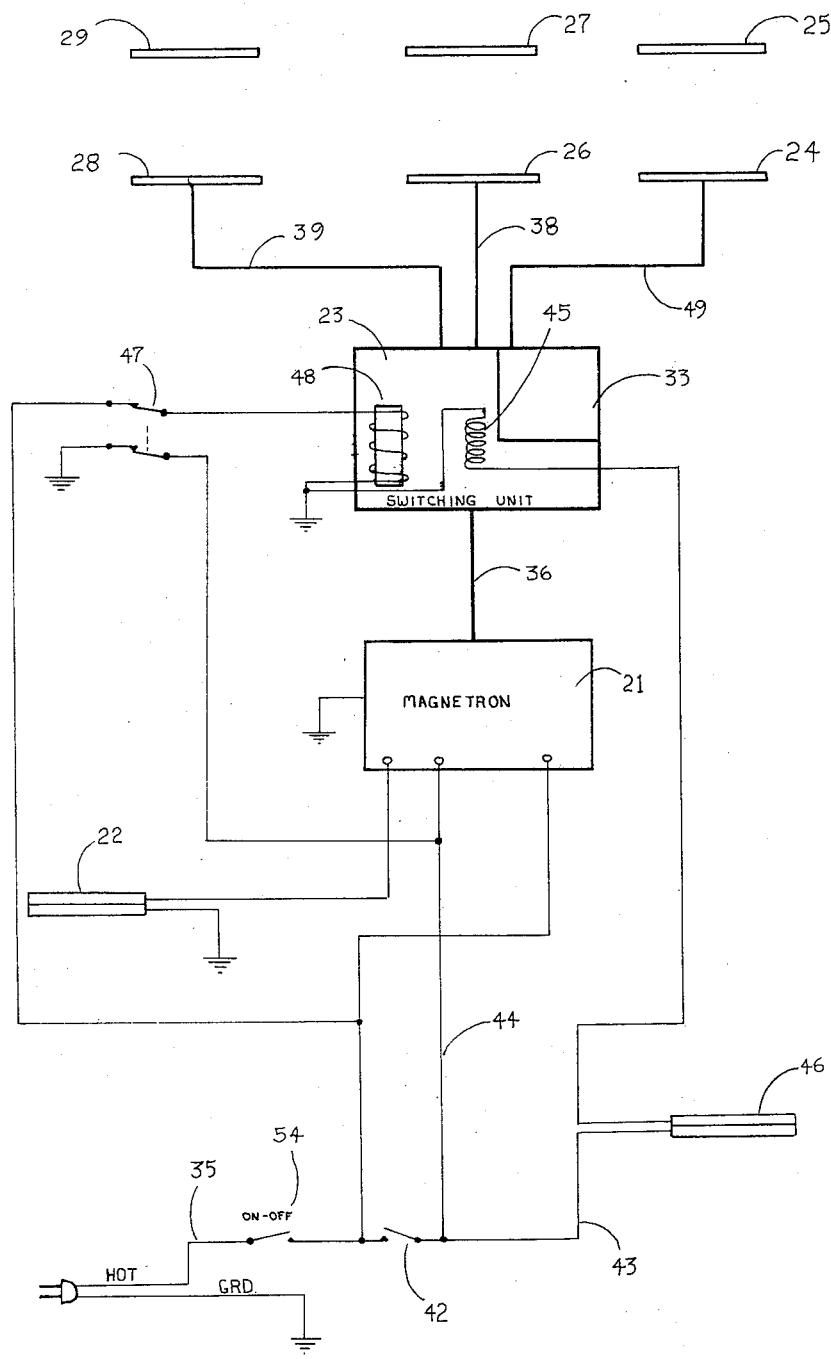
FIG. 2 is the wiring schematic for the invention.

Referring to FIG. 1–2, it will be seen that the present invention in its normal operating configuration is designed so that the temperature of the fluid contained within the reservoir system 17 is maintained at a temperature higher than non-heated tap water but at a lesser temperature than that required to open the hot water flow control thermostat 15, which is usually about 90° F., by an on/off bi-metallic thermostat 22 located in the secondary reservoir 32 which, upon sensing secondary reservoir 32 temperature below its preset temperature, closes electrical circuit 34 and thus actuates the micro-wave generating unit 21 to produce micro-wave radiation which flows through the switching unit wave guide 36 to the primary wave guide switching unit 23, whereupon the output of the micro-wave generating unit 21 is channeled equally into the initial reservoir wave guide 38 and the secondary reservoir wave guide 39 to the initial reservoir transmitting capacitive plate 26 and the secondary transmitting capacitive plate 28, respectively, thence through the water contained in the initial tubular reservoir 31 and the secondary tubular reservoir 32 to the initial reservoir receiving capacitive plate 27 and the secondary reservoir receiving capacitive plate 29 thus causing a rise in the temperature of the water contained within said reservoirs to a degree equal to the "off" setting of the bimetallic thermostat 22 thus opening electrical circuit 34 and deactivating the micro-wave generating unit 21.

When the user of such a system turns on the hot water delivery tap 19 an electrical on/off switch of prior art termed the hot water delivery switch 42 is cammed to the "on" position thus activating the hot water delivery electrical circuit 43 and the magnetron activation electrical circuit 44 simultaneously.

Activation of the hot water delivery electrical circuit 43 in turn activates an electro magnet or other similar switching type mechanism of prior art 45 within the switching unit 23 to cause the full power output of the magnetron in the micro-wave generating unit 21 to be directed through the initial wave guide 38 into the initial reservoir transmitting plate 26 through the water contained in the initial tubular reservoir 31 to the initial reservoir receiving capacitive plate 27 and thus rapidly heating the water contained within the initial tubular reservoir 31 to such a degree that the hot water flow control thermostat 15 located in the neck of the hot water delivery pipe 14 opens and permits the flow of the heated water in the initial tubular reservoir 31, which is under pressure from its source, out of the initial tubular reservoir 31 through the hot water delivery pipe 14 to and out of the hot water delivery tap 19 to the user. Also, simultaneously with the opening of the hot water flow control thermostat 15 the rise in the temperature of the water within the initial tubular reservoir 31 is sensed by the wave guide continuous flow bi-metallic thermostat 46.

When the wave guide continuous flow bi-metallic thermostat 46 which is located within the initial tubular reservoir 31 senses a present temperature that is equal to what was required to open the hot water flow control thermostat 15 the wave guide continuous flow bi-metallic thermostat 46 activates and opens the hot water delivery electrical circuit via control wire 43 thus deactivating wave guide switching mechanism 45 and thereby switching the output of the micro-wave generating unit 21 so that the full output of the micro-wave generating unit 21 is no longer directed into the initial reservoir wave guide 38 but rather is once again divided equally between the initial reservoir wave guide 38 and the secondary reservoir wave guide 39 to provide a continuous and even heating of water passing into and through the secondary tubular reservoir 32 and the initial reservoir 31 of such degree that the hot water flow control thermostat 15 remains open to permit the passage of heated water through said system to the user.

When the user of such a system desires to withdraw boiling water he must first open the boiling water delivery tap 18 to displace the safety finger 53 and then activate the boiling water delivery switch 47. Activation of said switch performs two functions: First, it causes an electronic switching mechanism 48 of prior art in the switching unit 23 to so align the wave guides that the full power of the micro-wave generating unit 21 will be directed through the boiling water wave guide 49 to the boiling water transmitting capacitive plate 24 through the water contained within the boiling water reservoir 30 to the boiling water capacitive receiving plate 25; secondly, it activates the micro-wave generating unit 21.

Upon activation of the boiling water delivery switch 47 and the subsequent rapid heating of the water in the boiling water tubular reservoir 30 by the full power of the micro-wave producing unit 21 to such a degree (usually 212° F.) the boiling water flow control thermostat 16 opens to allow the passage of the heated water through the boiling water delivery pipe 20 and the boiling water delivery tap 18 to the user.

The amount of boiling water that can be delivered from such a system at any time is limited to the volume of the boiling water reservoir 30. Closure of the boiling water delivery tap 18 causes the safety finger 53 to deactivate the boiling water delivery switch 47 and thus return said heating system to an idle condition.

While I have illustrated and described the preferred embodiments of my invention, it is to be understood that I do not limit myself to the precise construction or configuration herein disclosed and that various changes and modifications may be made within the scope of the invention as defined in the appended claims.

Having thus described my invention, what I claim as new and desire to secure by United States Letters of Patent is:

1. An apparatus for heating fluids contained therein or flowing therethrough, comprising a coiled tubular casing means open at opposite ends to define a passage therethrough and a reservoir for said fluids; electrical means for producing and supplying micro-wave energy to a plurality of dielectric plates for heating said fluids, said electrical means comprising means for connecting therewith an external power source and thermostatically controlled electric switching means to control the temperature of fluids within said casing by selectively directing or terminating the flow of micro-wave energy to said dielectric plates; said dielectric plates being arranged within said apparatus to provide micro-wave radiation to specific portions of said tubular casing within said total fluid reservoir by the placement of the respective pairs of said dielectric plates around or on each of said specific portions of tubular casing, fluid control thermostat means operably disposed within the fluid reservoir, an insulation blanket or container to surround the fluid reservoir and the positioned dielectric plates to retard heat loss from the fluids contained within the reservoir, a case to surround the total reservoir, dielectric plates and insulation blanket or container and to shield against the dissemination of micro-wave radiation beyond the enclosed system.

2. The apparatus of claim 1 which further includes a "T" juncture in said tubular casing upstream of the portions of said casing heated by the dielectric plates, said "T" juncture being operably connected with tubular means for directing a portion of the fluid entering the apparatus, unheated, around the heated portion of the apparatus.

3. The apparatus of claim 1 wherein said tubular casing terminates in two separate fluid delivery pipe means, one of which is provided with a fluid control thermostat which permits heated fluid to flow through at a predetermined temperature and the other of which is provided with a fluid control thermostat which permits boiling fluid to pass through it.

4. The apparatus of claim 1 in which three discrete portions of said tubular casing means are each respectively heated by a pair of dielectric plates operatively connected in said electrical system.

5. An apparatus for heating fluids contained therein or flowing therethrough comprising, in operative relationship, tubular casing means open at opposite ends to define a passage therethrough and a reservoir for said fluids; three individual pairs of dielectric plates arranged to heat respectively, initial, secondary and boiling portions of said tubular casing means, electrical means for producing and supplying micro-wave energy to said dielectric plates, said electrical means comprising means for connecting therewith an external power source and thermostatically controlled electric switching means to selectively direct or terminate the flow of micro-wave energy to the respective pairs of dielectric plates so that fluid in said boiling portion of the tubular casing means may be heated to and maintained at boiling, and fluid in the initial and secondary portions of the casing means may be heated to and maintained at another lower, predetermined temperature; said apparatus further comprising two separate fluid delivery pipe means disposed at the downstream terminus of said tubular casing means, one of said delivery pipe means being provided with a fluid control thermostat which permits heated fluid to flow through at a predetermined temperature and the other of which is provided with a fluid control thermostat which permits boiling fluid to pass through it; each of said fluid delivery pipe means being also provided with valve means at its downstream end for controlling the flow of fluid therethrough, the delivery pipe means valve for carrying heated fluid being provided with switch means for directing all micro-wave energy to the dielectric plates which heat the initial and secondary portions of the tubular casing means when said valve is open; and the delivery pipe means valve for carrying boiling fluid being provided with switch means for directing all micro-wave energy to the dielectric plates which heat the boiling portion of said tubular casing means when it is open.

6. The apparatus of claim 5 wherein said thermostatically controlled electric switching means, when the delivery pipe valve for heated fluids is opened, initially directs all micro-wave energy to the dielectric plates heating the initial portion of the tubular casing until said predetermined temperature is reached, and then directs the micro-wave energy between the plates heating the initial and secondary portions of the casing.

* * * * *